United States Patent [19]

Hudson

[11] Patent Number: 4,649,948

[45] Date of Patent: Mar. 17, 1987

[54] ENTRY TAP VALVE FOR PRESSURIZED PIPE LEAK DETECTOR

[75] Inventor: James H. Hudson, Sunrise, Fla.

[73] Assignee: Leak Detective, Inc., Sunrise, Fla.

[21] Appl. No.: 671,247

[22] Filed: Nov. 14, 1984

[51] Int. Cl.4 .................. G01M 3/04; G01M 3/24; F16L 55/00

[52] U.S. Cl. .................. 137/15; 73/40.5 A; 137/318

[58] Field of Search ............. 73/40, 40.5 R, 40.5 A, 73/432 G; 137/15, 312, 317, 318; 138/94, 97

[56] References Cited

U.S. PATENT DOCUMENTS

| | | | |
|---|---|---|---|
| 2,884,624 | 4/1959 | Dean et al. | 73/40.5 A |
| 3,091,260 | 5/1963 | Milanovits et al. | 138/94 |
| 3,478,576 | 11/1969 | Bogle | 73/40.5 A |
| 4,067,353 | 1/1978 | DeHoff | 137/318 |
| 4,411,459 | 10/1983 | Ver Nooy | 137/15 |
| 4,485,668 | 12/1984 | Hudson et al. | 73/40.5 A |
| 4,519,415 | 5/1985 | Carn | 137/318 |

Primary Examiner—George L. Walton
Attorney, Agent, or Firm—John W. Huckert

[57] ABSTRACT

A fluid pressure entry tap valve for use with pressurized pipes comprising a Wye device with an on-off valve of the ball type in each of two forks of the Wye. Preferably, one fork is in-line with the stem of the Wye while the other fork is at an angle thereto. The Wye stem is externally threaded for complementary engagement with a pipe saddle structure. The saddle structure is designed for either clamping to the pipe, or for being welded thereto.

During use the Wye fork which is straight in-line with the stem has it's ball valve opened so a wet tap drill can be inserted to make an opening into the pipe under pressure. Then after removal of the drill the associated valve is closed. A curved guide directional shoe then is mounted upon the Wye, the valve opened again, and the guide inserted through the Wye into the pressurized pipe. Then the ball valve in the angled other fork of the Wye can be opened and a detector head of leak detector apparatus inserted therethrough into the pipe while still under pressure.

The method of installing a Wye device with a pressurized pipe, tapping the pipe while under pressure, inserting a directional guide structure, and then inserting a detector head into the pressurized pipe while still under pressure in the desired direction for detecting leaks therein is also part of this invention.

15 Claims, 9 Drawing Figures

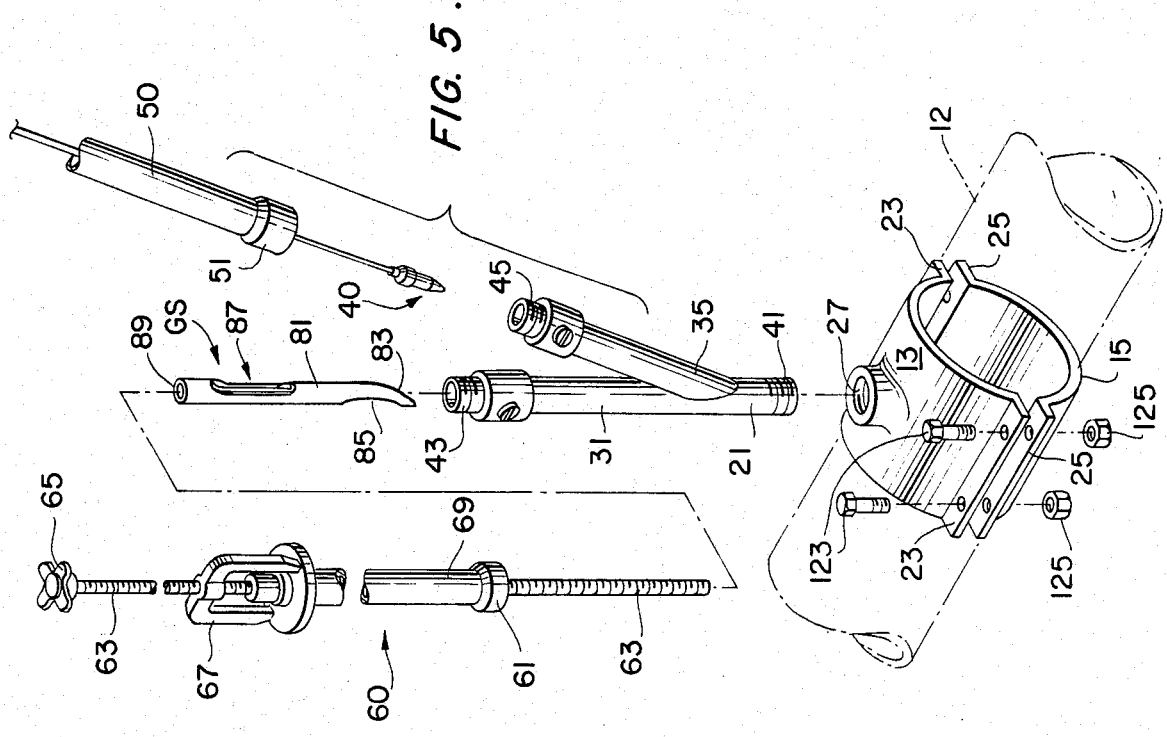
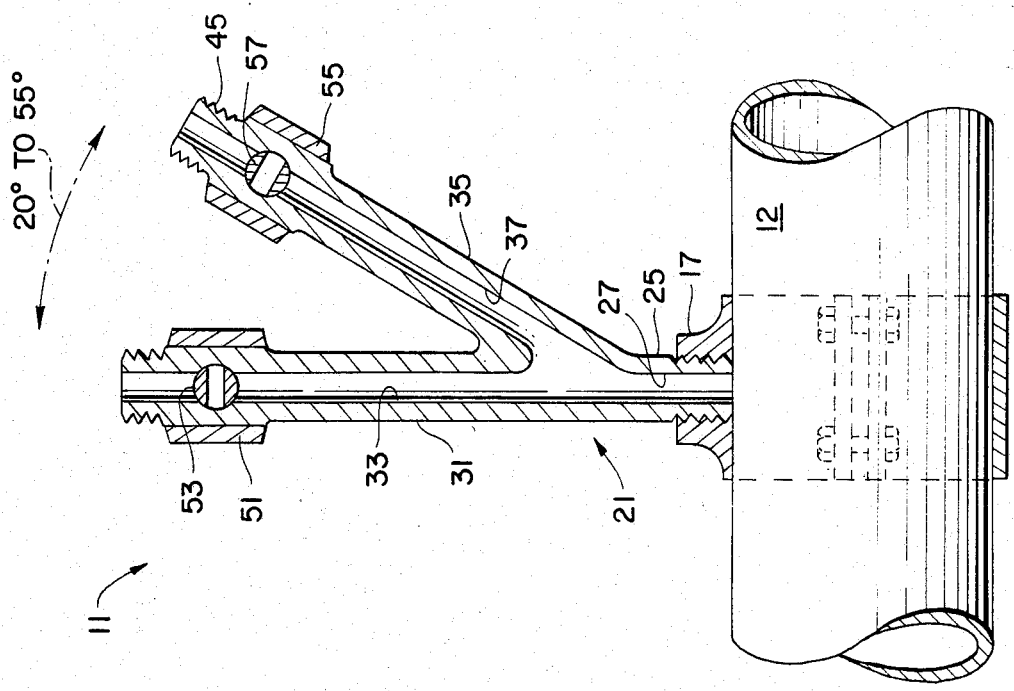

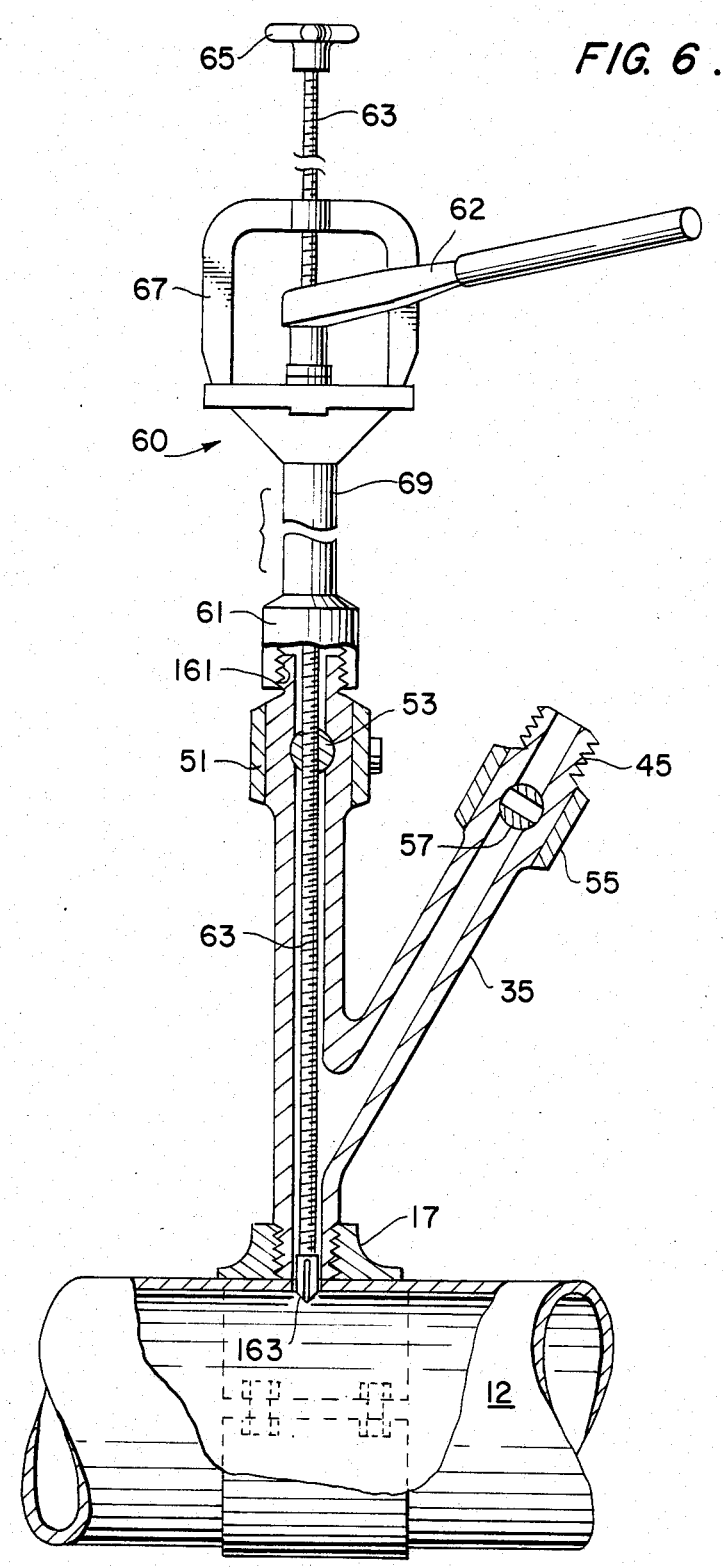

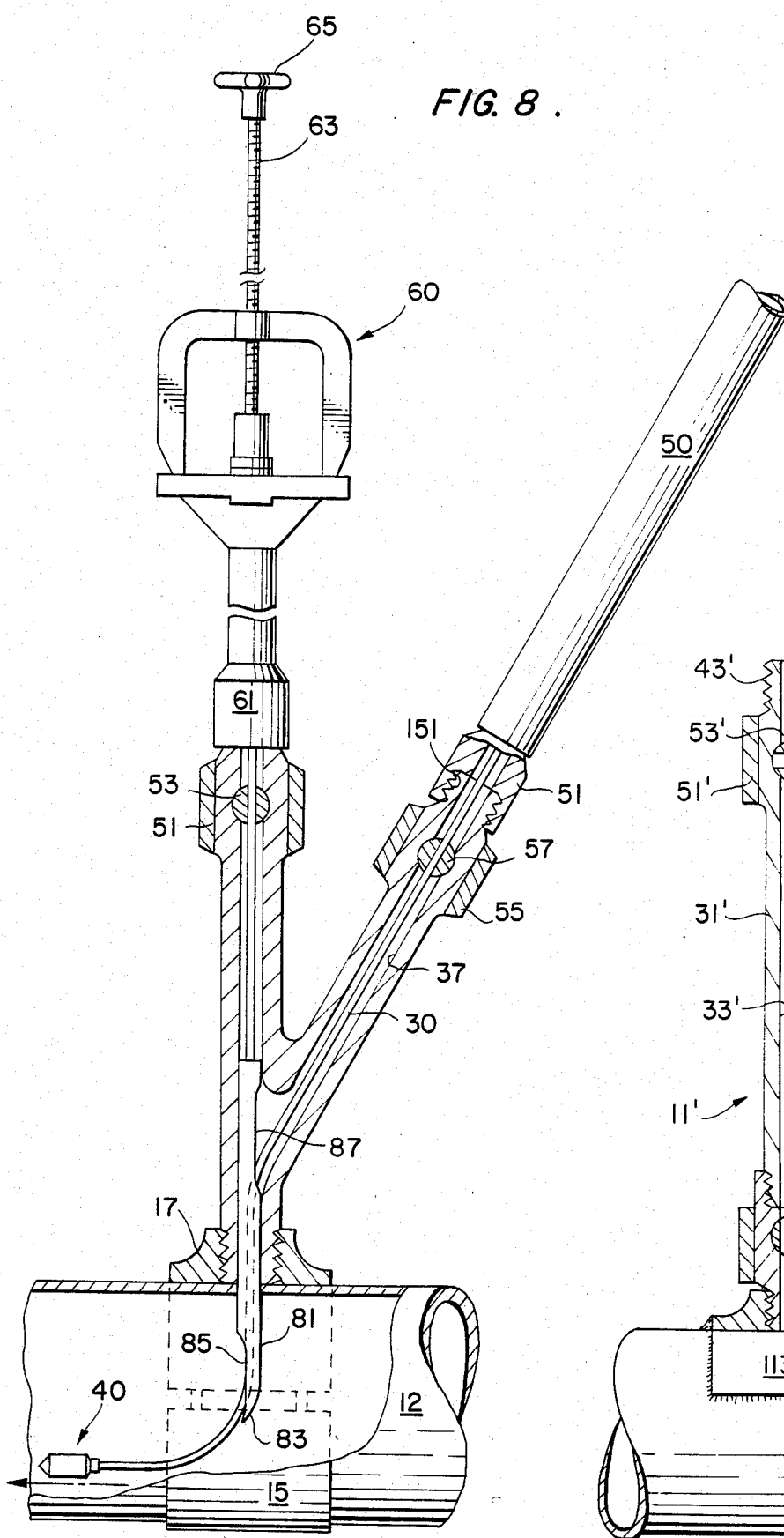

ENTRY TAP VALVE FOR PRESSURIZED PIPE LEAK DETECTOR

BACKGROUND OF THE INVENTION

1. Field of the Invention

This invention relates generally to an entry tap valve for permitting a pressurized pipe to have a leak detector inserted thereinto at an appropriate spot therealong in order to ascertain and locate a leak or leaks in the pipe while it is still under pressure.

2. Description of the Prior Art

A common problem with known type tap and entry valves is that they can not be installed and/or used while the pipe being tapped is still pressurized. Also, often they fail to function properly and/or leak fluid therefrom during use.

Another common problem of known tap valves is that they are not designed or structured so as to permit easy or quick entry therethrough of a detector head unit for leak detector apparatus. That is, they either have too small an entry passageway and/or have obstructions therewithin to prevent easy passage of such a detector head.

A still further problem is that the known type valve taps leave much to be desired in simplicity and/or usefulness. The materials generally used for such taps fail to meet all of the desired performance qualities, and yet still are relatively expensive.

Still another common problem of known tap valves is that they are not designed or structured so as to permit entry therethrough of a deflecting guide shoe for the detector head unit of a leak detector apparatus.

Existing prior patents which may be pertinent to this invention are as follows:

| | | |
|---|---|---|
| 1,263,929 (GREAT BRITAIN) | Tew et al | August 7, 1974 |
| 3,691,819 | Guest | Sept. 19, 1972 |
| 4,073,302 | Jones | Feb. 14, 1978 |
| 4,418,572 | Prange | Dec. 6, 1983 |

The Tew et al (Great Britain) patent discloses a gas main 1 having a standpipe 2 with cover (not shown) for entry to the main by a hose 3 with nozzle assembly 4. A spoon 5 having a curved end 6 helps guide the nozzle and hose in a manner similar to the deflecting guide shoe of the present invention. However, the rest of the device is entirely different from the entry tap structure of the present invention.

The Jones (U.S. Pat. No. 4,073,302) device is for cleaning sewer and other pipes. A sewer pipe 12 is shown having an entry standpipe 15 with an angled upper edge 16 for guiding hose 70. However, the overall structure is quite different from applicant's invention.

The Guest U.S. Pat. No. 3,691,819 discloses a detector pig which is caused to move through a pipe by sel-propelling structure, while the Prange U.S. Pat. No. 4,418,572 discloses a sewer pipe tester. However, neither the Guest nor the Prange patents disclose the entry tap structure for their respective detector-tester apparatus, and therefor do not teach anything like the present invention.

None of the known prior art devices offer the new and novel features of the present invention.

SUMMARY OF THE INVENTION

An object of the present invention is to provide a simple yet reliable entry tap valve comprising only a few components including dual valve elements mounted on two portions of a wye structure. One portion being in line with the stem of the wye, and the other portion at an angle thereto.

Another object of this invention is to provide a simple and inexpensive dual valve wye structure which as a single unit can be installed on a pressurized pipe while still under pressure. One of the dual valves which is in a port in-line with the stem permits the tapping of the pressurized pipe and the other valve which is in a an angled port permits entry of a detector head of leak detector apparatus sometime thereafter.

A further object of this invention is to provide a dual valve wye device having dual on-off valves therein, and the wye device being adapted for quick and easy installation on a pressurized pipe through use of complementary saddle structure. The saddle structure may be designed to be either clamped to the pipe, or welded thereto.

A still further object is for an entry tap device which will function at very high fluid pressures without leaking, which can be installed on a pipe while same is in use and under pressure, and which will allow quick and easy insertion and use of a leak detector head with accompanying apparatus for detecting leaks. A directional guide shoe is also provided for use with the device.

Yet another object is a dual valve wye device which can either be installed permanently or temporarily. For temporary installation, another on-off valve is used.

Still another object is a method of installing an entry tap device in a pressurized pipe while it is still pressurized and inserting a leak detector head into the pipe for detecting leaks therein still without depressuring the pipe. These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a side elevational view, partly in cross-section, of the entry tap valve of the present invention.

FIG. 5 is a perspective view in exploded form of the entry tap valve, pipe saddle clamp, and curved guide directional shoe of the present invention together with a drilling machine and leak detector head structure.

FIG. 6 is a side elevational view, partly in cross-section, of the entry tap valve of the present invention with the detector head unit structure and the drilling machine tap mounted thereon.

FIG. 8 is a side elevational view, partly in cross-section, of the entry tap valve and directional shoe as in use with the detector head passing therethrough.

FIG. 9 is another embodiment of the invention using a third ball valve.

DESCRIPTION OF THE PREFERRED EMBODIMENT

Figure 1:
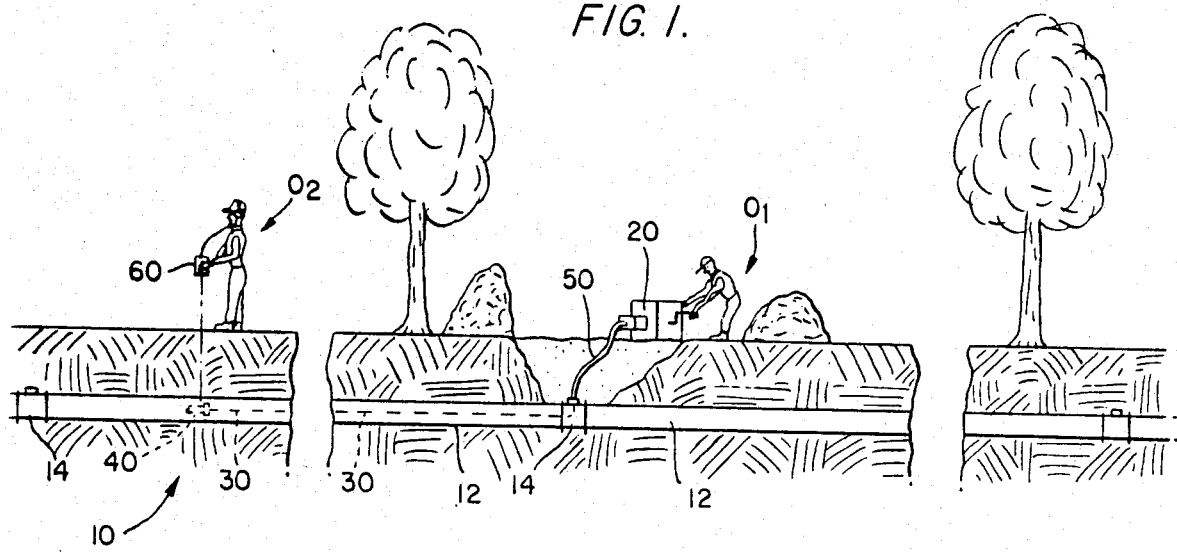
FIG. 1 is a perspective view of a leak detector being used for detecting a leak in a pressure main.

Referring to FIG. 1 of the drawings, reference numeral 10 indicates in general a leak detector as in use for detecting a leak, or leaks, in a pressure main. This apparatus preferably is like that disclosed and claimed in application Ser. No. 431,688, filed Sept. 30, 1982, now U.S. Pat. No. 4,485,668, and assigned to the same assignee as the present application. The disclosure of this application is hereby specifically incorporated herein by this reference thereto.

Figure 2:
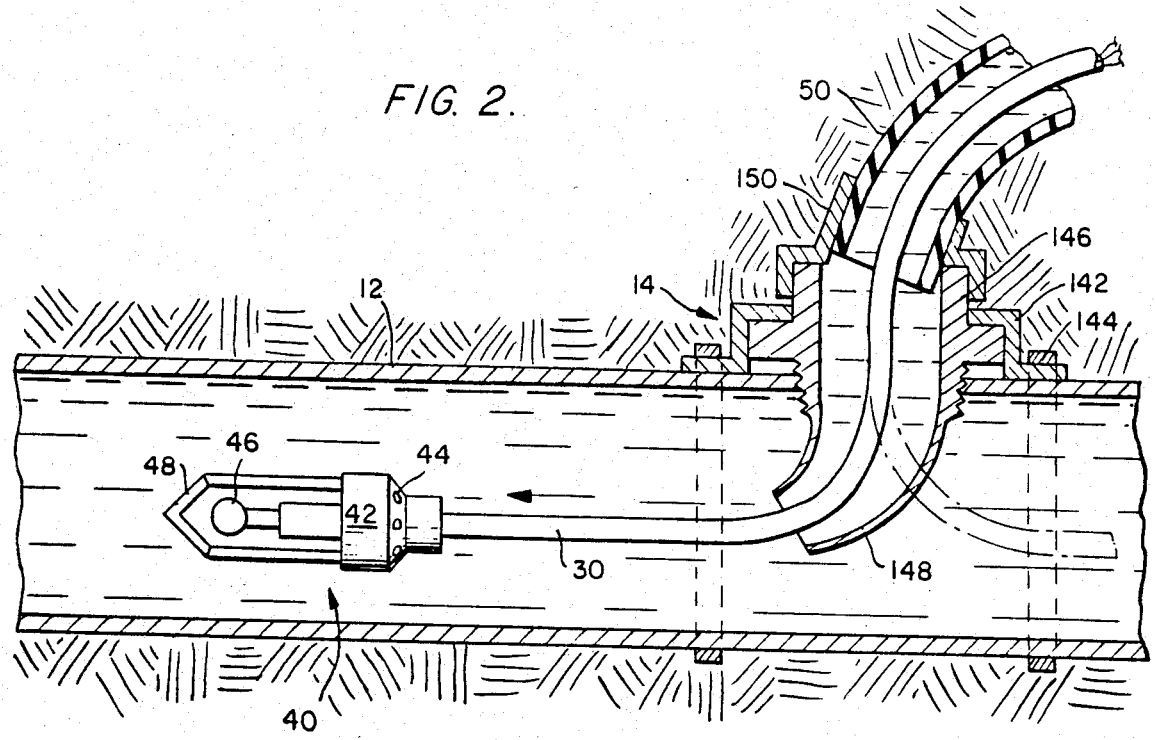
FIG. 2 is a side elevational view, partly in cross-section, of the detector head unit and the entry tap for the apparatus depicted in FIG. 1.
Figure 3:
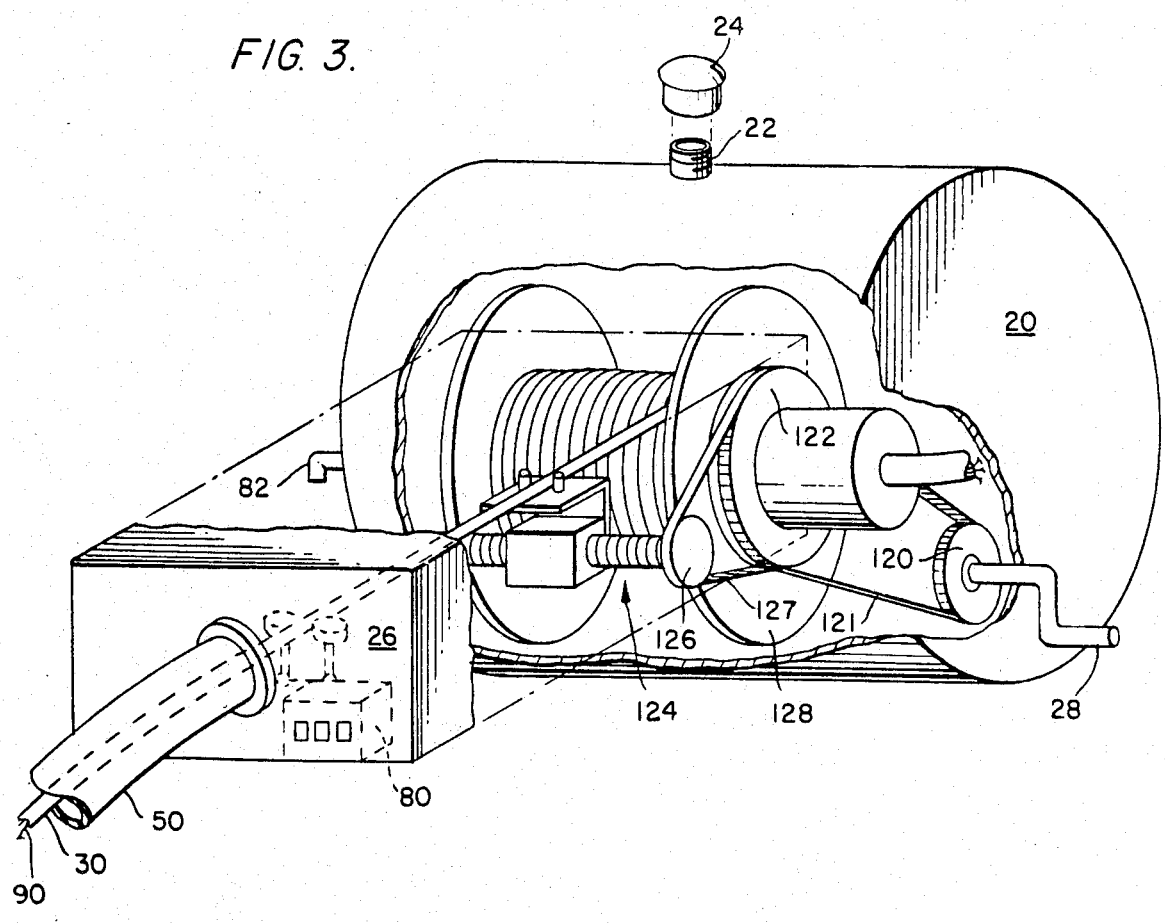
FIG. 3 is a perspective view of the hose and cable supply reel structure for the apparatus depicted in FIG. 1.

FIGS. 2 and 3, as well as FIG. 1 are like those same figures of Ser. No. 431,688, and the same parts and reference numbers are used here as in that application. A T-tap structure 14 is used to permit entry of detector head unit 40 and hose/cable 30 into a water main. However, in that invention, normally the water main is depressurized prior to insertion of the detector head unit.

The present invention is an improvement thereover wherein an entry tap valve can be installed with a pipe while the pipe is under pressure, and then the detector head unit of the leak detecting apparatus inserted and used while the pipe is still pressurized. Of course, this can achieve a substantial saving in both time and expense in the art of leak detection.

Looking at FIG. 4, the entry tap improvement of the present invention will be described. Reference numeral 11 indicates in general the primary component of this invention. A Wye device 21 has a stem portion 25 and two fork portions 31 and 35. The stem 25 has a longitudinal passageway 27, and the forks 31 and 35 have respective longitudinal passageways 33 and 37. The fork 31/passageway 33 is straight and in-line with stem 25/passageway 27, while fork 35/passageway 37 is at an angle thereto. The angle preferably is 30 degrees, but is still acceptable in the range of 20 to 55 degrees.

Each fork of the Wye device has a positively acting On-Off ball valve therewith. The ball valve 51 is with the in-line fork 31, and the ball valve 55 is with the angled fork 35. The respective ball elements 53 and 57 permit a full passage therethrough when open of substantially the same internal diameter as the respective passageways 33 and 37 within forks 31 and 35. This is necessary so that the desired operation and method can be effected with this device.

As best seen in FIG. 5, a detector head 40 is normally inserted through passageway 37 of the angled fork 35. Similarly, a drilling machine 60 is attached to and used with the straight in-line passageway 33 of the fork 31. The drilling machine is used both for drilling a hole in the pipe 12, and for inserting a directional guide shoe GS through passageway 33 and part way into the pipe 12. With this invention, all the preceding can be done while pipe 12 is under pressure and in use.

The saddle clamp depicted in FIG. 5 has one piece 13 with a projection 17 therewith, and a second attaching piece 15 for securely holding piece 13 against pipe 12. Of course, suitable gasket material and/or compound (not shown) may be used between the inner curved surfaces of the clamp and the pipe to prevent any leakage thereby. Radial flanges 23 and 25 receive bolts 123 thru suitable apertures, and lock nuts 125 tighten the flanges together. Projection 17 has an opening 27 centrally thereof which goes into the center of piece 13 of the clamp. The opening 27 is threaded for receiving complementary male threads such as 41 on the Wye stem 21.

FIG. 6 shows the Wye device of this invention after initial attachment to a pipe 12 by use of a saddle clamp 12-13 as described above. The ball element 57 of the ball valve 55 remains closed, while ball element 53 of ball valve 51 has been opened to permit passage of drill bit 163 therethrough. The drilling machine 60 has a body 69 with an attachment head 61 at one end and a yoke 67 at the other end. The yoke 67 supports a feedscrew 63 with handwheel 65 thereon and a ratchet wrench 62. As shown, the drilling machine is used to drill an opening into the pipe 12. First, a wet tap drill bit 163 is attached to the end of feedscrew 63 and then after opening ball valve 51 inserted through passageway 33-27 into engagement with the pipe 12. Of course, the coupling 61 of body 69 is secured tightly to in-line fork 31. The drill machine then is used to bore a hole in pipe 12. Thereafter, drill machine 60 is removed and valve 51 closed.

Figure 7:
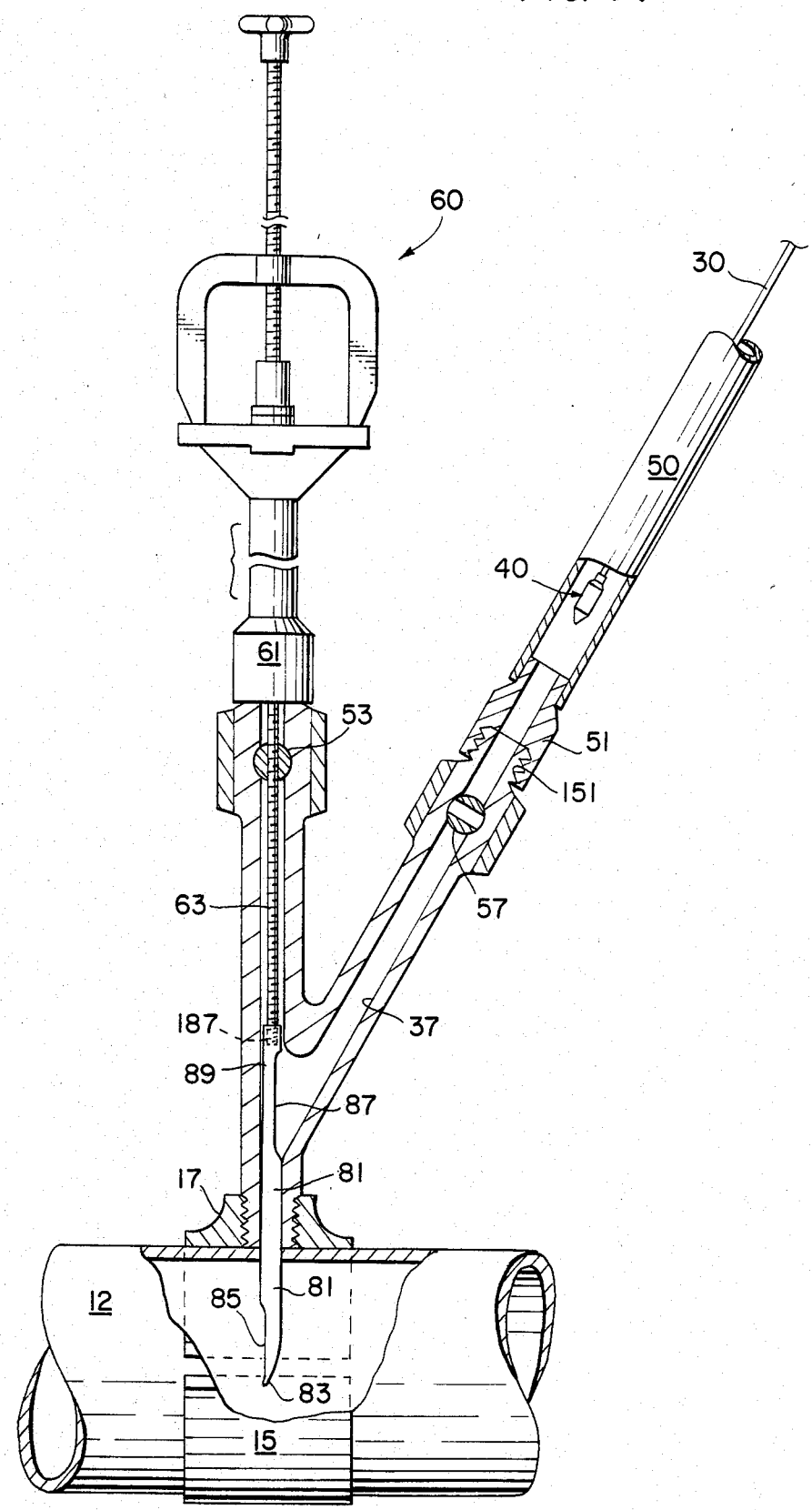
FIG. 7 is a side elevational view, partly in cross-section, of the entry tap valve with the drilling machine being used to insert the curved guide directional shoe into the pressurized pipe.

Next, as shown in FIG. 7, the drill machine 60 is used to insert the directional guide shoe GS into pipe 12. The guide shoe is a tubular member 81 having a curved tip lower end 83 with side opening slot 85. Another side opening slot 87 is provided in the middle and upper portion of member 81. This slot opens on the opposite side of the member 81 from slot 85. The upper end 89 of tubular member 81 is threaded 187 for receiving the tip end of threaded feedscrew 63. As should be apparent, once the guide shoe GS has been attached to feedscrew 63, the drill machine can again be securely mounted upon fork 31 of the Wye device, valve ball element 53 again opened, and the feedscrew 63 operated to insert the guide shoe GS into pipe 12.

The coupling hose 50 from the leak detector reel takeup station can now be attached to angled fork 35 by a coupling 51 having internal threads 151 for receiving the external threads 45 on the end of the angled fork 35. Once hose 50 is securely attached, as shown in FIG. 7, then ball valve element 57 can be opened as shown in FIG. 8, and the detector head 40 passed through passageway 37, slot 87 in the guide shoe, and out of slot 85 in the proper direction for feeding along inside of pipe 12, as per the steps outlined in application Ser. No. 431,688 now U.S. Pat. No. 4,485,668. Of course, the hose/cable 30 permits operator control of the detector head at all times. After the leak detection process has been completed the detector head 40 is withdrawn, the guide shoe GS is withdrawn and valves 53 and 57 again closed, and the detector apparatus completely removed from the Wye device of this invention.

While FIGS. 1-8 depict the preferred embodiment of the invention, FIG. 9 shows an alternative embodiment. In this Fig., elements like those of the primary embodiment have the same reference numbers with a prime added. The saddle clamp 13-15 has been replaced by a saddle 113 which is attached to pipe 12 by welding W. Between the internally threaded projection 17' and the Wye device 11' is inserted another On-Off ball valve AV. This valve can be like the valves 51 and 55 already described. The advantage of this embodiment is that after all of the procedures set forth above have taken place, the normally open valve AV can be closed and the Wye device removed for use at another place. Thus, during initial installation of the pipe 12 for use as city water mains or the like, a plurality of saddles 113 can be installed therealong at relatively minor cost. Then later, whenever a leak occurs, the Wye device of the present invention can be installed in an appropriate saddle 113, and the pipe drilled, guide shoe inserted, and the leak detection operation effected as disclosed herein.

The embodiment of FIG. 9 has a coupling portion 361 with internal threads 461 mounted on the end of a third valve AV. Thus, the embodiment of FIGS. 1-8 can be used with this embodiment having a third On-Off valve.

The foregoing is considered as illustrative only of the principles of the invention. Further, since numerous modifications and changes will readily occur to those skilled in the art, it is not desired to limit the invention to the exact construction shown and described, and accordingly, all suitable modifications and equivalents may be resorted to, falling within the scope of the invention.

What is claimed is:

1. An entry tap device comprising:
   a wye structure having a forked end with two inlets and a stem end with an outlet which connects internally with said two inlets;
   a separate saddle structure adapted to be mounted upon a pipe under pressure for receiving the end of said wye having the outlet;
   a first on-off valve in one of said two inlets;
   a second on-off valve in the other of said two inlets;
   means for providing access for a tap drill device through said first on-off valve when open so an opening can be made in said pressurized pipe including said one inlet being directly in-line through the wye structure with said outlet; a guide shoe is attached to said drill device to be inserted through said opening and into said pipe; and
   said other inlet is at an oblique angle to said outlet so that a detector head of a leak detecting apparatus can be inserted into said other inlet and through said second on-off valve and into said one inlet; said detector head being received within said guide shoe to guide said detector head in the desired direction within said pipe without causing any kinking for detecting and locating any leaks therein.

2. An entry tap device as set forth in claim 1, wherein said saddle structure includes clamping means for affixing same to said pressurized pipe.

3. An entry tap device as set forth in claim 1, wherein said saddle structure is designed for affixing same to said pressurized pipe by welding.

4. An entry tap device as set forth in claim 3, wherein said guide shoe having a curved deflecting surface over a portion thereof.

5. An entry tap device as set forth in claim 4, wherein said said guide shoe includes a tubular guide element having an entry slot and an exit slot.

6. An entry tap device as set forth in claim 5, wherein said slots are on opposite sides of said tubular guide element.

7. A method of installing an entry tap device in a pressurized pipe while it is in use comprising the following steps:
   affixing a saddle structure to the pressurized pipe;
   inserting a wye device having a pair of inlets with an on-off valve in each inlet into an aperture in the saddle structure;
   opening one of said on-off valves;
   inserting a tap drill device through said open valve and into contact with said pressurized pipe;
   drilling a hole with the tap drill device in the pipe until an opening is made in the pipe;
   removing the tap drill and attaching a deflecting guide shoe thereto and inserting the drill device and said guide shoe through said open valve and into said pipe;
   opening the other on-off valve; and
   inserting a detector head of leak detector apparatus through said open other valve into said guide shoe and into the interior of said pressurized pipe for guiding said detector head in the desired direction within said pipe without causing any kinking for detecting and locating any leaks therein.

8. A method of installing an entry tap device in a pressurized pipe as set forth in claim 7; including the further step of using a third on-off valve between the wye device and the saddle so that the wye device can be removed from the pressurized pipe after the leak detection operation is completed.

9. A method of installing an entry tap device in a pressurized pipe as set forth in claim 7, wherein the affixing step includes attaching the saddle structure to the pressurized pipe by welding.

10. A method of installing an entry tap device in a pressurized pipe as set forth in claim 7, wherein the affixing step includes attaching the saddle structure to the pressurized pipe by clamping.

11. An entry tap device for use with pipes under pressure comprising:
    a wye structure having a forked end with two inlets and a stem end with an outlet which connects internally with the two inlets;
    a saddle structure adapted to be mounted upon a pipe under pressure for receiving the end of said wye having the outlet;
    a first ball valve in one of said two inlets;
    a second ball valve in the other of said two inlets;
    means with said wye structure for providing access for a tap drill device through said first ball valve when open so that an opening can be made in the pressurized pipe;
    said means including the one inlet being directly in-line through the wye structure with said outlet; a guide shoe is attached to said drill device to be inserted through said opening and into said pipe; and
    said other inlet being at a acute angle of 20° to 55° to said one inlet so that a detector head of leak detecting apparatus can be inserted into said other inlet and through said second ball valve and into said one inlet; said detector head being received within said guide shoe to guide said detector head in the desired direction within said pipe without causing any kinking for detecting and locating any leaks therein.

12. An entry tap device as set forth in claim 11, wherein said guide shoe comprises an elongated tubular guide element having a curved deflecting surface at one end thereof.

13. An entry tap device as set forth in claim 12, wherein said tubular guide element has an entry slot on one side thereof and an exit slot on the opposite side thereof.

14. An entry tap device as set forth in claim 13, together with a third ball valve between said wye structure and said saddle structure for permitting removal of the wye structure for use with another saddle structure.

15. An entry tap device as set forth in claim 11, together with a third ball valve between said wye structure and said saddle structure for permitting removal of the wye structure for use with another saddle structure.

* * * * *